United States Patent
Connor, Jr. et al.

(10) Patent No.: US 12,180,097 B2
(45) Date of Patent: *Dec. 31, 2024

(54) HYBRID ELECTROCHEMICAL AND MEMBRANE-BASED PROCESSES FOR TREATING WATER WITH HIGH SILICA CONCENTRATIONS

(71) Applicant: TEXOPCO LLC, Houston, TX (US)

(72) Inventors: Michael James Connor, Jr., Porter, TX (US); Amanda Yoshino, Houston, TX (US)

(73) Assignee: TexOPCO LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,536

(22) Filed: Mar. 20, 2023

(65) Prior Publication Data
US 2023/0295019 A1    Sep. 21, 2023

Related U.S. Application Data

(63) Continuation of application No. 17/035,119, filed on Sep. 28, 2020, now Pat. No. 11,608,282.
(Continued)

(51) Int. Cl.
*B01D 61/04* (2006.01)
*C02F 1/44* (2023.01)
(Continued)

(52) U.S. Cl.
CPC ............ *C02F 1/4695* (2013.01); *B01D 61/04* (2013.01); *C02F 1/441* (2013.01); *C02F 1/463* (2013.01);
(Continued)

(58) Field of Classification Search
CPC ........ C02F 1/4695; C02F 1/441; C02F 1/463; C02F 2103/04; C02F 2103/08;
(Continued)

(56) References Cited

U.S. PATENT DOCUMENTS 4,808,287 A    2/1989  Hark
6,537,456 B2   3/2003  Mukhopadhyay
(Continued)

FOREIGN PATENT DOCUMENTS

WO    WO-2016028972 A1 *  2/2016  ............. B01D 61/58

OTHER PUBLICATIONS

Connor et al., Notice of Allowance dated Dec. 8, 2022, directed to U.S. Appl. No. 17/035,119; 8 pages.
(Continued)

*Primary Examiner* — Joseph W Drodge
(74) *Attorney, Agent, or Firm* — Harvest IP Law LLP; Guerry L. Grune

(57) ABSTRACT

Provided are hybrid electrochemical and membrane-based systems for removing silica from water stream to achieve ultra-pure water. The silica concentration of a feed water stream may dictate the most effective and economical variation of disclosed hybrid processes to use. For example, for a feed water stream having a silica concentration of 1-30 ppm, a hybrid system for treating the feed water includes an electrodialysis reversal unit, the electrodialysis reversal unit comprising an inlet stream and a product outlet stream; a reverse osmosis unit, the reverse osmosis unit comprising an inlet stream and a product outlet stream, wherein the inlet stream of the reverse osmosis unit comprises the product outlet stream of the electrodialysis reversal unit; and an
(Continued)

electrodeionization unit, the electrodeionization unit comprising an inlet stream and a product outlet stream, wherein the inlet stream of the electrodeionization unit comprises the product outlet stream of the reverse osmosis unit.

19 Claims, 5 Drawing Sheets

Related U.S. Application Data

(60) Provisional application No. 62/907,245, filed on Sep. 27, 2019.

(51) Int. Cl.
*C02F 1/46* (2023.01)
*C02F 1/463* (2023.01)
*C02F 1/469* (2023.01)
C02F 103/04 (2006.01)
C02F 103/08 (2006.01)

(52) U.S. Cl.
CPC .. *B01D 2311/2623* (2013.01); *C02F 2103/04* (2013.01); *C02F 2103/08* (2013.01); *C02F 2303/22* (2013.01)

(58) Field of Classification Search
CPC .......... C02F 2303/22; C02F 1/42; C02F 5/08; C02F 2001/46185; C02F 9/00; C02F 1/4618; C02F 1/4693; C02F 1/008; C02F 1/469; C02F 1/60; C02F 1/66; C02F 2201/461; C02F 2201/4611; C02F 2201/46115; C02F 2209/05; C02F 2209/06; C02F 2209/10; B01D 61/04; B01D 61/10; B01D 61/12; B01D 61/42; B01D 61/422; B01D 2311/04; B01D 2311/06; B01D 2311/252; B01D 2311/2623; B01D 2311/2684
See application file for complete search history.

(56) References Cited

U.S. PATENT DOCUMENTS

| | | | |
|---|---|---|---|
| 11,608,282 B2 * | 3/2023 | Connor, Jr. | ............... C02F 9/00 |
| 2003/0034292 A1 | 2/2003 | Rela | |
| 2004/0188352 A1 | 9/2004 | Dey et al. | |
| 2005/0103717 A1 | 5/2005 | Jha et al. | |
| 2008/0171118 A1 | 7/2008 | Bazinet et al. | |
| 2008/0185294 A1 | 8/2008 | Cai et al. | |
| 2011/0086291 A1 | 4/2011 | Valk et al. | |
| 2011/0120886 A1 | 5/2011 | Jha et al. | |
| 2013/0288142 A1 | 10/2013 | Fu et al. | |
| 2014/0291253 A1 | 10/2014 | Coulter | |
| 2014/0360878 A1 | 12/2014 | Paulus et al. | |
| 2015/0315055 A1 | 11/2015 | Chidambaran | |
| 2015/0329386 A1 | 11/2015 | Lin | |
| 2016/0002076 A1 | 1/2016 | Jha et al. | |
| 2017/0129306 A1 * | 5/2017 | Komatsu | ................ B62D 25/06 |
| 2017/0129796 A1 | 5/2017 | Iyer | |
| 2018/0273412 A1 | 9/2018 | Hall et al. | |

OTHER PUBLICATIONS

Connor et al., U.S. Office Action dated Aug. 9, 2022, directed to U.S. Appl. No. 17/035,119; 14 pages.

* cited by examiner

HYBRID ELECTROCHEMICAL AND MEMBRANE-BASED PROCESSES FOR TREATING WATER WITH HIGH SILICA CONCENTRATIONS

CROSS-REFERENCE TO RELATED APPLICATIONS

This application is a continuation of U.S. application Ser. No. 17/035,119, filed Sep. 28, 2020, which claims the priority of U.S. Provisional Application No. 62/907,245, filed Sep. 27, 2019, the entire contents of each of which are incorporated herein by reference.

FIELD OF THE DISCLOSURE

This disclosure relates to hybrid electrochemical and membrane-based processes for removing silica from water. Specifically, this disclosure relates to hybrid electrochemical and membrane-based processes comprising an electrodialysis bulk demineralization step, a high recovery reverse osmosis unit, and an electrodeionization unit to remove relatively high concentrations of silica from feed water to achieve ultra-high purity water.

BACKGROUND OF THE DISCLOSURE

Many industrial processes require ultrapure water (UPW). To reach such levels of water purity, specialized water treatment trains are required. This equipment is typically configured in a series of steps that progressively increase the purity of the water until it reaches its final quality requirements.

Typical source water contains many constituents that must be removed in order to achieve UPW quality. The constituents fall within four main categories: inorganics, organics, particulates, and microorganisms. Each of these constituents must be removed to the part per billion (ppb) range to meet UPW standards. The treatment train selected will vary slightly depending on the initial quantities of each in the feedwater. A general treatment approach includes pretreatment to remove large debris and suspended solids, bulk demineralization to remove almost all of the dissolved inorganics, and a polishing step to remove the remainder of the dissolved inorganics down to the ppb level.

The default treatment train to produce UPW has evolved over many years to optimize the economics. Initially, ion exchange mixed bed (IXMB) systems were used, consisting of a housing packed with a mixture of small resin beads of both anionic and cationic form. The anionic form resin exchanges negatively charged ions from the influent water for hydroxide ions (OH—) that are stored on the anionic beads. The cationic resin exchanges positively charged ions from the influent water for hydrogen ions (H+) that are stored on the cationic beads. The hydroxide ions and hydrogen ions then react to make pure H2O. Once all of the hydroxide and hydrogen ions stored on the resins are exchanged with charged contaminants, the resins are considered to be depleted and the housing is taken offline to be regenerated with a basic solution followed by an acidic solution to restore the resins to their original state. The IXMB approach is effective but requires significant chemical consumption due to the regeneration process.

Another variation of using primarily ion exchange (IX) is a separate bed IX system followed by IXMB. The separate bed IX consists of one housing with strong acid cationic (SAC) resin followed by another housing with strong basic anionic (SBA) resin. These consecutive IX beds remove most of the dissolved inorganics and an IXMB is used as a final polishing step. This process has simplified regeneration and reduced chemical consumption relative to using exclusively IXMB, but still consumes substantial chemicals for regeneration and, if the ionic load becomes very high, water recovery is limited due to frequent backwashing.

Once reverse osmosis (RO) became a common water treatment method, a process with RO followed by a polishing step became useful. Either IXMB or electrodeionization (EDI) was employed as the polishing step. This process reduces chemical consumption but leads to low overall water recovery due to silica concentrations limitations in the RO brine. This limit is approximately 325 parts per million (ppm) silica if a silica antiscalant is used.

A more widely-adopted process was the two-pass reverse osmosis (2PassRO). This had some added benefits relative to the other previously mentioned processes in that the first RO is used as a chemical-free softener for the second RO, and inter-pass caustic dosing to 8 to 9 may be employed to increase the CO2 rejection of the second RO. This train has low chemical consumption and yields a high purity product, but in water with moderate to high silica concentrations, it still suffers from low water recovery.

Another process occasionally used is the high efficiency reverse osmosis train, beginning with an IX-based softening step, followed by pH adjustment, followed by a high recovery RO and either an EDI or IXMB unit. Softening and pH adjusting allows the RO to handle high levels of silica, but the overall process still suffers from high chemical consumption due to the IX-based softening step.

SUMMARY OF THE DISCLOSURE

Provided are hybrid electrochemical and membrane-based processes for treating water with relatively high amounts of silica. The conventional processes described above (i.e., ion-exchange mixed bed systems, separate bed ion-exchange with ion-exchange mixed bed systems, reverse osmosis, two-pass reverse osmosis, or high efficiency reverse osmosis train) are insufficient because they cannot achieve the level of water recovery desired and/or they consume a relatively high amount of chemicals. Accordingly, hybrid electrochemical and membrane-based processes provided herein can achieve a relatively high water recovery with a relatively low level of chemical consumption. A higher water recovery can save valuable time and money, while a lower level of chemical consumption can save money and be less harmful to the environment.

Depending on the amount of silica in the feed water, one of several hybrid water treatment processes may be used to effectively remove the silica from the water and achieve ultra-high purity water. However, as described below, each process includes an electrodialysis reversal unit for bulk demineralization, a high recovery reverse osmosis unit, and an electrodeionization unit to polish the reverse osmosis permeate. The processes provided herein primarily relate to water that has already been processed through the normal pretreatment steps.

In some embodiments, a water treatment system is provided, the water treatment system comprising: an electrodialysis reversal unit, the electrodialysis reversal unit comprising an inlet stream and a product outlet stream; a reverse osmosis unit, the reverse osmosis unit comprising an inlet stream and a product outlet stream, wherein the inlet stream of the reverse osmosis unit comprises the product outlet stream of the electrodialysis reversal unit; and an electrodeionization unit, the electrodeionization unit comprising an inlet stream and a product outlet stream, wherein the inlet stream of the electrodeionization unit comprises the product outlet stream of the reverse osmosis unit, wherein the inlet stream of the electrodialysis reversal unit comprises water having a silica concentration of 1 to 30 ppm, and the product outlet stream of the electrodeionization unit comprises ultra-pure water.

In some embodiments of the water treatment system, the inlet stream of the electrodialysis reversal unit comprises 1 to 10 ppm antiscalant.

In some embodiments of the water treatment system, the inlet stream of the reverse osmosis unit comprises a concentrate outlet stream of the reverse osmosis unit.

In some embodiments of the water treatment system, the inlet stream of the electrodialysis reversal unit comprises a concentrate outlet stream of the electrodeionization unit.

In some embodiments of the water treatment system, the outlet stream of the reverse osmosis unit has a silica concentration of less than 1 ppm.

In some embodiments, a water treatment system is provided, the water treatment system comprising: an electrodialysis reversal unit, the electrodialysis reversal unit comprising an inlet stream and a product outlet stream; an ion-exchange unit, the ion-exchange unit comprising an inlet stream and a product outlet stream, wherein the inlet stream of the ion-exchange unit comprises the product outlet stream of the electrodialysis reversal unit; an electroacidification unit, the electroacidification unit comprising a product inlet stream, a product outlet stream, a brine inlet stream, and a brine outlet stream, wherein the product inlet stream of the electroacidification unit comprises the product outlet stream of the ion-exchange unit; a reverse osmosis unit, the reverse osmosis unit comprising an inlet stream and a product outlet stream, wherein the inlet stream of the reverse osmosis unit comprises the product outlet stream of the electroacidification unit; and an electrodeionization unit, the electrodeionization unit comprising an inlet stream and a product outlet stream, wherein the inlet stream of the electrodeionization unit comprises the product outlet stream of the reverse osmosis unit, wherein the inlet stream of the electrodialysis reversal unit comprises water having a silica concentration of 31 to 80 ppm, and the product outlet stream of the electrodeionization unit comprises ultra-pure water.

In some embodiments of the water treatment system, the brine inlet stream of the electroacidification unit comprises a concentrate outlet stream of the reverse osmosis unit.

In some embodiments of the water treatment system, the inlet stream of the electrodialysis reversal unit comprises a concentrate outlet stream of the electrodeionization unit.

In some embodiments of the water treatment system, the product outlet stream of the electroacidification unit has a silica concentration of 1-30% less than the silica concentration of the product outlet stream of the ion-exchange unit.

In some embodiments of the water treatment system, the product outlet stream of the electroacidification unit has a pH of 10-11.

In some embodiments of the water treatment system, the outlet stream of the reverse osmosis unit has a silica concentration of less than 1 ppm.

In some embodiments, a water treatment system is provided, the water treatment system comprising: an electrocoagulation unit, the electrocoagulation unit comprising an inlet stream and a product outlet stream; a solids removal unit, the solids removal unit comprising an inlet stream and a product outlet stream, wherein the inlet stream of the solids removal unit comprises the product outlet stream of the electrocoagulation unit; an electrodialysis reversal unit, the electrodialysis reversal unit comprising an inlet stream and a product outlet stream, wherein the inlet stream of the electrodialysis unit comprises the product outlet stream of the solids removal unit; an ion-exchange unit, the ion-exchange unit comprising an inlet stream and a product outlet stream, wherein the inlet stream of the ion-exchange unit comprises the product outlet stream of the electrodialysis reversal unit; an electroacidification unit, the electroacidification unit comprising a product inlet stream, a product outlet stream, a brine inlet stream, and a brine outlet stream, wherein the product inlet stream of the electroacidification unit comprises the product outlet stream of the ion-exchange unit; a reverse osmosis unit, the reverse osmosis unit comprising an inlet stream and a product outlet stream, wherein the inlet stream of the reverse osmosis unit comprises the product outlet stream of the electroacidification unit; and an electrodeionization unit, the electrodeionization unit comprising an inlet stream and a product outlet stream, wherein the inlet stream of the electrodeionization unit comprises the product outlet stream of the reverse osmosis unit, wherein the inlet stream of the electrodialysis reversal unit comprises water having a silica concentration of greater than 80 ppm, and the product outlet stream of the electrodeionization unit comprises ultra-pure water.

In some embodiments of the water treatment system, the brine inlet stream of the electroacidification unit comprises a concentrate outlet stream of the reverse osmosis unit.

In some embodiments of the water treatment system, the inlet stream of the electrocoagulation unit comprises a concentrate outlet stream of the electrodeionization unit.

In some embodiments of the water treatment system, the product outlet stream of the solids removal unit has a silica concentration of 60-98% less than the silica concentration of the inlet stream of the solids removal unit.

In some embodiments of the water treatment system, the product outlet stream of the electroacidification unit has a silica concentration of 1-30% less than the silica concentration of the product outlet stream of the ion-exchange unit.

In some embodiments of the water treatment system, the product outlet stream of the electroacidification unit has a pH of 10-11.

In some embodiments of the water treatment system, the product outlet stream of the reverse osmosis unit has a silica concentration of less than 1 ppm.

In some embodiments of the water treatment system, the inlet stream of electrocoagulation unit comprises a concentrate outlet stream of the reverse osmosis unit.

In some embodiments, a method of treating water is provided, the method comprising: measuring a silica concentration of feed water; and if the silica concentration of the feed water is 1 to 30 ppm: passing the feed water through an electrodialysis reversal unit comprising an inlet stream and a product outlet stream; routing the product outlet stream of the electrodialysis reversal unit to a reverse osmosis unit comprising an inlet stream and a product outlet stream; and routing the product outlet stream of the reverse osmosis unit to an electrodeionization unit comprising an inlet stream and a product outlet stream, the product outlet stream of the electrodeionization unit comprising ultra-pure water, if the silica concentration of the feed water is 31 to 80 ppm: passing the feed water through an electrodialysis reversal unit comprising an inlet stream and a product outlet stream; routing the product outlet stream of the electrodialysis unit to an ion-exchange unit comprising an inlet stream and a product outlet stream; routing the product outlet stream of the ion-exchange unit to an electroacidification unit comprising a product inlet stream, a product outlet stream, a brine inlet stream, and a brine outlet stream; routing the product outlet stream of the electroacidification unit to a reverse osmosis unit comprising an inlet stream and a product outlet stream; and routing the product outlet stream of the reverse osmosis unit to an electrodeionization unit comprising an inlet stream and a product outlet stream, the product outlet stream of the electrodeionization unit comprising ultra-pure water, and if the silica concentration of the feed water is greater than 80 ppm: passing the feed water through an electrocoagulation unit comprising an inlet stream and a product outlet stream; routing the product outlet stream of the electrocoagulation unit to a solids removal unit comprising an inlet stream and a product outlet stream; routing the product outlet stream of the solids removal unit to an electrodialysis reversal unit comprising an inlet stream and a product outlet stream; routing the product outlet stream of the electrodialysis reversal unit to an ion-exchange unit comprising an inlet stream and a product outlet stream; routing the product outlet stream of the ion-exchange unit to an electroacidification unit comprising a product inlet stream, a product outlet stream, a brine inlet stream, and a brine outlet stream; routing the product outlet stream of the electroacidification unit to a reverse osmosis unit comprising an inlet stream and a product outlet stream; and routing the product outlet stream of the reverse osmosis unit to an electrodeionization unit comprising an inlet stream and a product outlet stream, wherein the product outlet stream of the electrodeionization unit comprises ultra-pure water.

BRIEF DESCRIPTION OF THE DRAWINGS

The invention will now be described, by way of example only, with reference to the accompanying drawings, in which.

DETAILED DESCRIPTION OF THE DISCLOSURE

Provided are hybrid electrochemical and membrane-based systems and methods for removing silica from water. In particular, the hybrid systems and methods provided herein can achieve a higher water purity with a lower amount of chemical consumption than conventional systems and methods (i.e., ion-exchange mixed bed systems, separate bed ion-exchange with ion-exchange mixed bed systems, reverse osmosis, two-pass reverse osmosis, or high efficiency reverse osmosis train). By knowing the silica concentration of the feed water, the most effective and economical iteration of the hybrid systems and methods provided herein may be identified as the most appropriate system/method to use with that specific feed water.

Although various embodiments of hybrid systems and methods are provided herein for use with feed water having relatively high silica concentrations, each system/method includes an electrodialysis reversal unit for bulk demineralization, a high recovery reverse osmosis unit, and an electrodeionization unit to polish the reverse osmosis permeate. The systems/methods provided herein primarily relate to water that has already been processed through the normal pretreatment steps.

As used herein, the term "ultra-pure water" is defined as water that has been purified to uncommonly stringent standards. Specifically, ultra-pure water is water that has been treated to the highest levels of purity for all types of contaminants.

Hybrid electrochemical and membrane-based water treatment systems described below include: (1) processes for treating feed water having a relatively low silica concentration; (2) processes for treating feed water having a moderate silica concentration; and (3) processes for treating feed water having a relatively high silica concentration.

Figure 1:
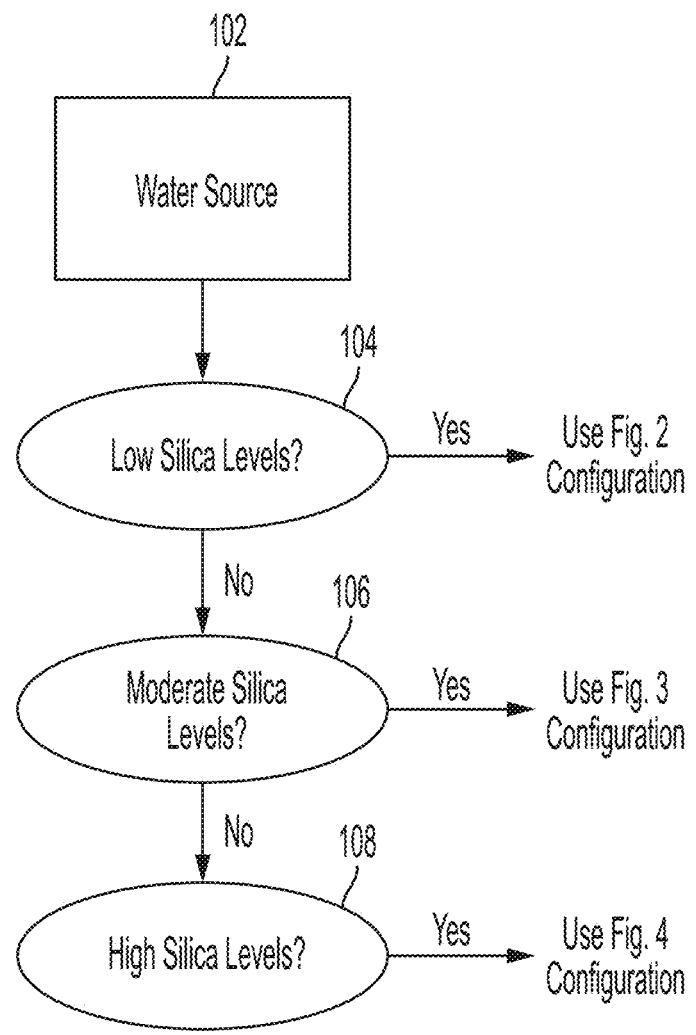
FIG. 1 shows a decision tree for use in determining which of various hybrid processes may be used to treat feed water, according to some embodiments.

FIG. 1 shows a decision tree that may be used to determine which of the three enumerated processes may be used. Although any of the three categories of hybrid treatment processes may be used to remove silica from water, regardless of the concentration of silica, one process may be more effective than another, based on the silica concentration of the feed water.

To determine which of the various processes may be most effective and/or economical, the silica concentration of feed water 102 may be used. Feed water 102 may be any one of various salinity levels: fresh (0 ppm to 500 ppm), brackish (500 ppm to 35,000 ppm), seawater (35,000 ppm to 45,000 ppm), or brine (>45,000 ppm). Feed water 102 may also be any one or various silica concentration levels: low (0 ppm to 30 ppm), moderate (31 ppm to 80 ppm), or high (>80 ppm). The silica concentration of the output water from any of the disclosed hybrid processes may depend on the pH of the water, the temperature of the water, and the concentration of other contaminants in the water that have the potential to form scale. The disclosed processes may be able to effectively treat water of any salinity level. In some embodiments, disclosed processes may be most effective at treating feed water 102 having a low to brackish salinity (50 ppm to 5000 ppm).

Figure 2:
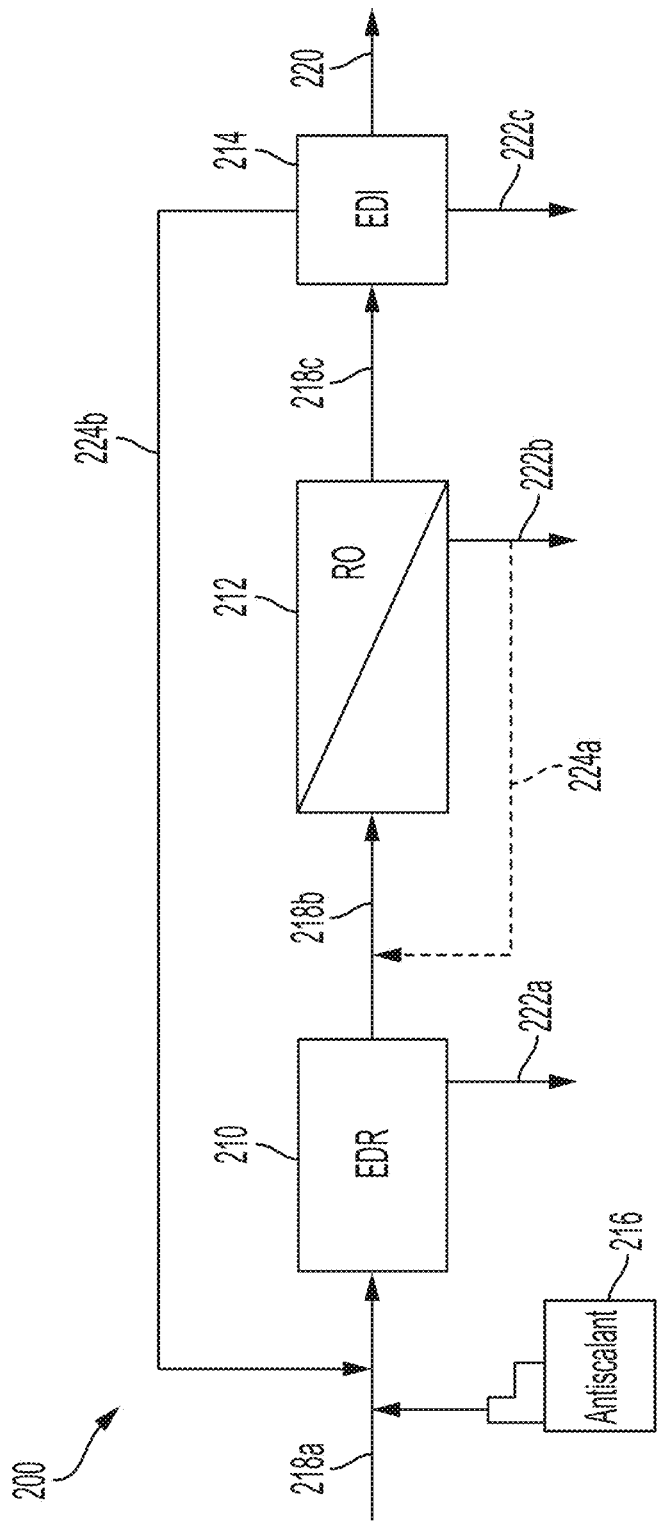
FIG. 2 shows a hybrid process for treating water of low silica concentration, according to some embodiments.

If the concentration of silica in feed water 102 is relatively low (0 ppm to 30 ppm), as indicated by item 104, the configuration of FIG. 2 may be used to most effectively and economically treat the water.

Figure 3:
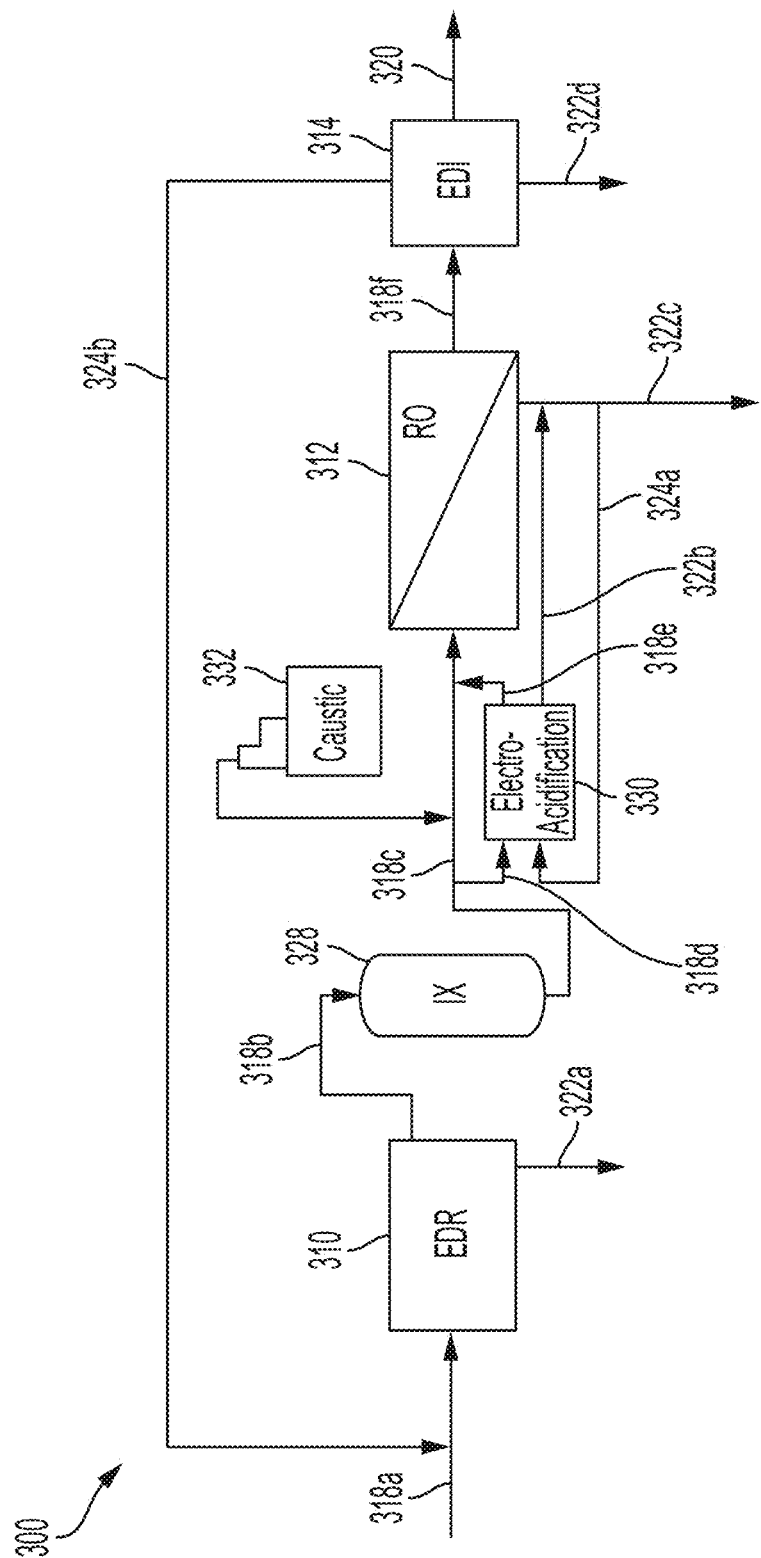
FIG. 3 shows hybrid process for treating water of moderate silica concentration, according to some embodiments.

If the concentration of silica in feed water 102 is moderate (31 ppm to 80 ppm), as indicated by item 106, the configuration of FIG. 3 may be used to most effectively and economically treat the water.

Figure 4:
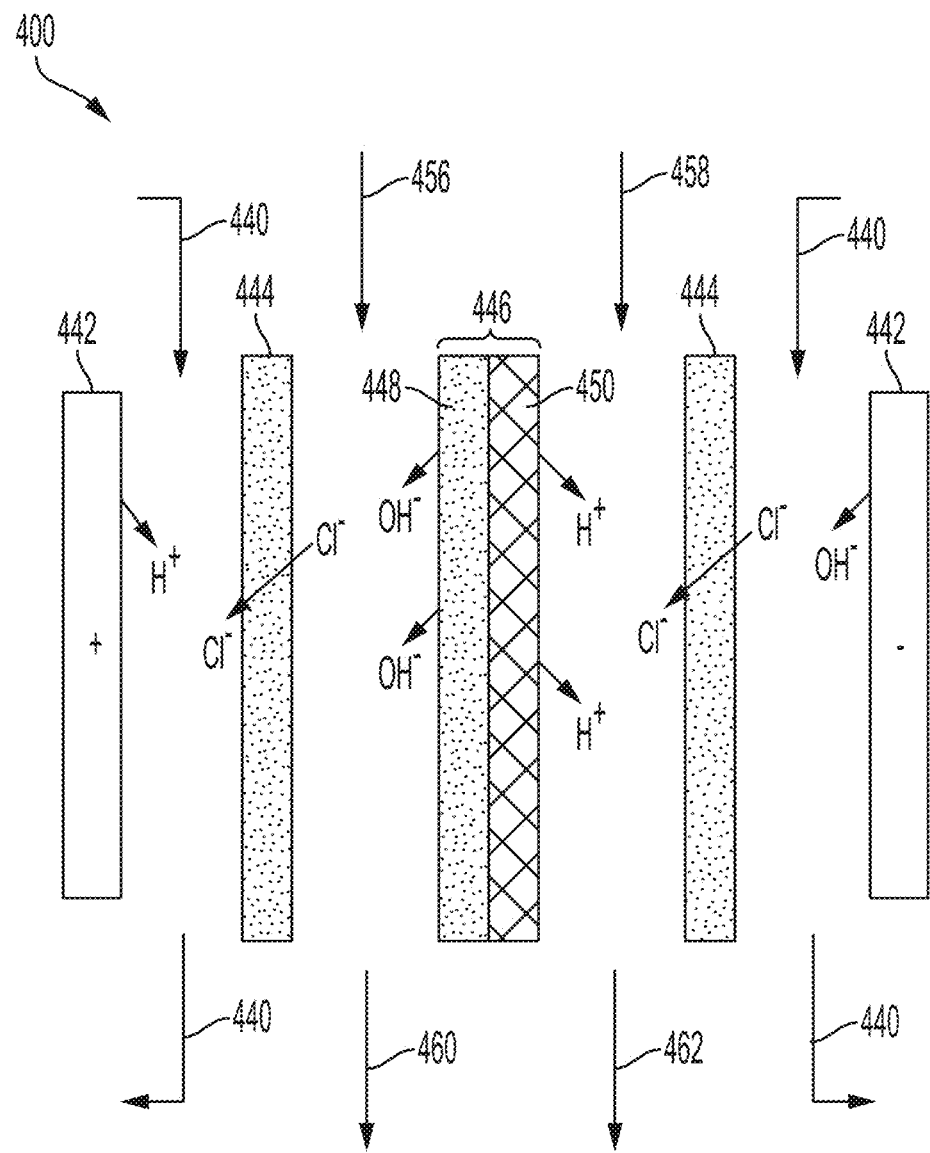
FIG. 4 shows an individual bipolar membrane electrodialysis device that may be used in an electroacidification unit, according to some embodiments.

If the concentration of silica in feed water 102 is high (>80 ppm), as indicated by item 108, the configuration of FIG. 4 may be used to most effectively and economically treat the water.

Treating Feed Water Having a Low Silica Concentration

As explained above, particular embodiments of hybrid water treatment processes described herein may be used to most effectively and economically treat water having relatively low silica concentrations (0 ppm to 30 ppm). In some embodiments, hybrid processes for treating water having low silica concentrations may include an electrodialysis reversal unit, a reverse osmosis unit, and/or an electrodeionization unit.

FIG. 2 shows hybrid process 200 for treating feed water having relatively low silica concentrations. Hybrid process 200 includes input 218a, antiscalant 216, electrodialysis reversal unit 210, reverse osmosis unit 212, electrodeionization 214, and product 220. Hybrid process 200 also includes streams 218b, 218c, 222a, 222b, 222c, 224a, and 224b.

As described above, input 218a may be feed water having a salinity of low to brackish (50 ppm to 5000 ppm). Input 218a may also include any concentration of silica. However, to achieve ultra-pure water as effectively and economically as possible, the feed water of input 218a may include a silica concentration of 0 ppm to 30 ppm.

Antiscalant 216 may be used to treat input water 218a by inhibiting or delaying scale formation. In some embodiments, antiscalant 216 1-30 ppm antiscalant or 1-10 ppm antiscalant may be dosed. In some embodiments, less than 30 ppm, less than 20 ppm, or less than 10 ppm antiscalant may be dosed. In some embodiments, more than 1 ppm, more than 10 ppm, or more than 20 ppm antiscalant may be dosed. Antiscalant 216 can help protect against scalants such as calcium carbonate, calcium sulfate, barium sulfate, strontium sulfate, calcium fluoride, magnesium hydroxide, and/or silica. Suitable antiscalants can include a commercial antiscalant such as Vitec 4000 or another phosphonate.

Input 218a (treated with antiscalant 216 or untreated) may be routed to electrodialysis reversal unit 210. Electrodialysis reversal unit 210 may be used for bulk demineralization, since electrodialysis may be capable of handling higher concentrations of scale-forming species (e.g., silica) than other treatment process units, such as reverse osmosis. Electrodialysis reversal unit 210 may comprise one or more electrodialysis devices for removing silica from water.

An individual electrodialysis device (i.e., an ion-exchange device) can include at least one pair of electrodes and at least one pair of ion-exchange membranes placed there between. The at least one pair of ion-exchange membranes can include a cation-exchange membrane ("CEM") and an anion-exchange membrane ("AEM"). In addition, at least one of the ion-exchange membranes (i.e., CEMs and/or AEMs) has a spacer on the surface of the ion-exchange membrane facing the other ion-exchange membrane in an electrodialysis device. In some embodiments, both the CEMs and the AEMs have a spacer on at least one surface facing the other ion-exchange membrane.

In some embodiments, electrodialysis reversal unit 210 may be configured to remove silica from input 218a such that stream 218b (i.e., diluate stream or output stream) exiting electrodialysis reversal unit 210 comprises a silica concentration of less than that of input 218a. In some embodiments, the silica concentration of stream 218b may be 1-20 ppm or 1-10 ppm. In some embodiments, the silica concentration of stream 218b may be less than 20 ppm, less than 15 ppm, less than 10 ppm, or less than 5 ppm. In some embodiments, the silica concentration of stream 218 may be more than 1 ppm, more than 5 ppm, more than 10 ppm, or more than 15 ppm.

The conductivity of stream 218b may also be less than that of input 218a. In some embodiments, the conductivity of stream 218b (i.e., diluate) may be 1-75 microsiemens per centimeter (µS/cm) or 1-25 µS/cm. In some embodiments, the conductivity of stream 218b may be less than 100 µS/cm, less than 75 µS/cm, less than 50 µS/cm, less than 25 µS/cm, or less than 10 µS/cm. In some embodiments, the conductivity of stream 218b may be more than 1 µS/cm, more than 10 µS/cm, more than 25 µS/cm, more than 50 µS/cm, or more than 75 µS/cm.

Electrodialysis reversal unit 210 includes two outlet streams—stream 218b is the diluate and stream 222a is the brine stream. In some embodiments, stream 222a may be a waste stream.

Stream 218b may be both the output stream for electrodialysis reversal unit 210 and the input stream for reverse osmosis unit 212. Reverse osmosis unit 212 may use a partially permeable membrane to remove ions when an applied pressure is used to overcome the osmotic pressure of the system. This reverse osmosis process can further lower the silica concentration in the water. In some embodiments, reverse osmosis unit 212 may be capable of tolerating water having a silica concentration of up to 325 ppm depending on the pH of the water and the temperature of the water. As shown in the figure, stream 218b is the input stream for reverse osmosis unit 212 and stream 218c is the output permeate stream. Reverse osmosis unit 212 may also produce a concentrate stream (i.e., stream 222b). In some embodiments, stream 222b may be waste. In some embodiments, particularly in situations where the water recovery may be limited by a low flux rate across the membranes of the reverse osmosis unit 212, hybrid process 200 may include a concentrate recycle loop 224a. As shown, recycle loop 224a runs from concentrate stream 222b upstream to stream 218b (that is the feed stream for reverse osmosis unit 212).

In some embodiments, the stream 218c (i.e., the outlet stream of reverse osmosis unit 212) may have a silica concentration of 0.01 to 5 ppm. In some embodiments, the silica concentration of stream 218c may be less than 5 ppm, less than 4 ppm, less than 3 ppm, less than 2 ppm, less than 1 ppm, less than 0.5 ppm, less than 0.1 ppm, or less than 0.05 ppm. In some embodiments, the silica concentration of stream 218c may be more than 0.01 ppm, more than 0.05 ppm, more than 0.1 ppm, more than 0.5 ppm, more than 1 ppm, more than 2 ppm, more than 3 ppm, or more than 4 ppm.

In some embodiments, the conductivity of the permeate of stream 218 is lower than that of streams 218b and 218a. In some embodiments, the conductivity of stream 218c may be 1-90 µS/cm, 1-60 µS/cm, or 1-20 µS/cm. In some embodiments, the conductivity of stream 218c may be less than 90 µS/cm, less than 80 µS/cm, less than 70 µS/cm, less than 60 µS/cm, less than 50 µS/cm, less than 40 µS/cm, less than 30 µS/cm, less than 20 µS/cm, or less than 10 µS/cm. In some embodiments, the conductivity of stream 218c may be more than 1 µS/cm, more than 10 µS/cm, more than 20 µS/cm, more than 30 µS/cm, more than 40 µS/cm, more than 50 µS/cm, more than 60 µS/cm, more than 70 µS/cm, or more than 80 µS/cm. In some embodiments, the permeate of stream 218c may also have low concentrations of weakly ionized species such as silica and boron, and/or low concentrations of contaminants such as total organic carbon (TOC) or carbon dioxide.

In some embodiments, hybrid process 200 may include electrodeionization unit 214. Electrodeionization unit 214 may be used as a polishing step after processed by reverse osmosis unit 212. As shown in the figure, stream 218c is the input stream for electrodeionization unit 214. From electrodeionization unit 214, product stream 220 is generated, in addition to a concentrate stream (i.e., stream 222c). In some embodiments, stream 222c may be a waste stream. In some embodiments, product stream 220 may comprise ultra-pure water.

In some embodiments, electrodeionization unit 214 is configured to further reduce the level of contaminants (e.g., silica) in the water. For example, the level of silica in product stream 220 may be from 0.001 to 0.030 ppm. In some embodiments, the silica concentration in the product stream may be less than 0.030 ppm, less than 0.025 ppm, less than 0.02 ppm, less than 0.015 ppm, less than 0.01 ppm, or less than 0.005 ppm. In some embodiments, the silica concentration of the product stream may be more than 0.001 ppm, more than 0.005 ppm, more than 0.010 ppm, more than 0.015 ppm, more than 0.020 ppm, or more than 0.025 ppm.

The conductivity of the water may also be reduced, such that the conductivity of product stream 220 is less than that of stream 218a, 218b, and/or 218c. In some embodiments, the conductivity of product stream 220 may be from 0.01 µS/cm to 1 µS/cm. In some embodiments, the conductivity of product stream 220 may be less than 1 µS/cm, less than 0.8 µS/cm, less than 0.6 µS/cm, less than 0.4 µS/cm, less than 0.2 µS/cm, less than 0.1 µS/cm, less than 0.08, less than 0.06, less than 0.04, or less than 0.02 µS/cm. In some embodiments, the conductivity of product stream 220 may be more than 0.01 µS/cm, more than 0.02 µS/cm, more than 0.04 µS/cm, more than 0.06 µS/cm, more than 0.08 µS/cm, more than 0.1 µS/cm, more than 0.2 µS/cm, more than 0.4 µS/cm more than 0.6 µS/cm, or more than 0.8 µS/cm.

In some embodiments, the concentrate stream may be recycled back to an upstream location of hybrid process 200. For example, as shown in the figure, recycle loop 224b is routed from electrodeionization unit 214 comprising concentrate from the electrodeionization unit 214, to input 218a. This recycle loop can help increase the overall water recovery rate of hybrid process 200.

Treating Feed Water Having a Moderate Silica Concentration

As explained above, particular embodiments of hybrid water treatment processes described herein may be used to most effectively and economically treat water having moderate silica concentrations (31 ppm to 80 ppm). In some embodiments, hybrid processes for treating water having moderate silica concentrations may include an electrodialysis reversal unit, a reverse osmosis unit, and/or an electrodeionization unit. In some embodiments, hybrid processes for treating water having moderate silica concentrations may also include an ion-exchange unit and/or an electroacidification unit.

FIG. 3 provides a hybrid process 300 for treating water having moderate silica concentrations. In some embodiments, hybrid process 300 may include electrodialysis reversal unit 310, ion-exchange unit 328, electroacidification unit 330, caustic 332, reverse osmosis unit 312, and electrodeionization unit 314. Additionally, hybrid process 300 may include input stream 318a, process streams 318b, 318c, 318d, 318e, and 318f, product 320, waste streams 322a, 322b, 322c, and 322d, and recycle loops 324a and 324b.

As described above, input 318a may be feed water having a salinity of low to brackish (50 ppm to 5000 ppm). Input 318a may also include any concentration of silica. However, to achieve ultra-pure water as effectively and economically as possible, the feed water of input 318a may include a silica concentration of 31 ppm to 80 ppm.

In some embodiments, hybrid process 300 may include electrodialysis reversal unit 310. Electrodialysis reversal unit 310 may include any or all features of electrodialysis reversal unit 210 of FIG. 2. By passing the feed water through a bulk demineralization step (i.e., electrodialysis reversal unit 310) prior to ion-exchange unit 328, the amount of chemical consumption can be significantly reduced. As shown, input stream 318a is the input to electrodialysis reversal unit 310. Electrodialysis reversal unit 310 may produce two different outlet streams—a product outlet comprising treated water/diluate (i.e., stream 318b) and a brine stream (i.e., stream 322a). In some embodiments, stream 322a may be a waste stream. In some embodiments, the silica concentration of stream 318b may be less than that of input stream 318a. For example, the silica concentration of stream 318b may be 5 to 60 ppm. In some embodiments, the silica concentration of stream 318b may be less than 60 ppm, less than 50 ppm, less than 40 ppm, less than 30 ppm, less than 20 ppm, or less than 10 ppm. In some embodiments, the silica concentration of stream 318b may be more than 5 ppm, more than 10 ppm, more than 20 ppm, more than 30 ppm, more than 40 ppm, or more than 50 ppm.

The position of electrodialysis reversal unit 310 before ion-exchange unit 328 may help to lower to total dissolved solids in the feed water to very low ppm levels. The product feed of the electrodialysis reversal unit 310 may then be fed through ion-exchange unit 328 as a hardness removal polishing step to further lower the hardness of the water. In some embodiments, this configuration may help minimize the consumption of chemicals, particular those used during ion-exchange regeneration.

In some embodiments, the product of electrodialysis reversal unit 310, stream 318b, is fed to an ion-exchange unit 328. In some embodiments, ion-exchange unit 328 may comprise a strong acid caustic system in the sodium form. In some embodiments, ion-exchange unit 328 may comprise a strong acid caustic system in the hydrogen form. If ion-exchange unit 328 is in the sodium form, it may be regenerated in with a sodium chloride brine solution instead of hydrochloric acid or sulfuric acid. The output stream of ion-exchange unit 328 is stream 318c.

In some embodiments, stream 318c may be routed from ion-exchange unit 328 directly to reverse osmosis unit 312. In some embodiments, stream 318c may be routed to electroacidification unit 330 (via stream 318d). In some embodiments, electroacidification unit 330 is a modified electrodialysis process in which bipolar membranes are used to split water to generate hydroxide ions and protons when a potential difference is applied greater than approximately 0.83 volts. Bipolar membranes are composed of a cation exchange membrane on one side and anion exchange membrane the other side, which enables water splitting at the junction of the two membranes. The bipolar nature prevents the transfer of ions across the membrane. More detail of electroacidification units may be found in U.S. Provisional Application No. 62/831,508 titled "Electrodialysis Process and Bipolar Membrane Electrodialysis Devices for Silica Removal," the entire contents of which are incorporated herein. Electroacidification process units are beneficial in that they do not require any chemicals to modify the pH of the water. Instead, caustic and/or acid are generated in-place using the bipolar membranes of the electroacidification unit 330.

The ion-exchange product (i.e., stream 318c) is fed to electroacidification unit 330 (via stream 318d). By passing the ion-exchange product through electroacidification unit 330, the pH of the water can be adjusted up to 10-10.5. This increase in pH can increase silica solubility in the brine stream of reverse osmosis unit 312. Simultaneously, the reverse osmosis brine flow (i.e., stream 324a) feeds into the channel in which pH is decreased with the addition of a proton. Thus, the brine outlet (i.e., stream 322b) of electroacidification unit 330 has a pH that is less than that of brine inlet (i.e., stream 324a) and product outlet (i.e., stream 318e) of electroacidification unit 330 has a pH that is greater than product inlet (i.e., stream 318d). In some embodiments, the silica concentration of the product outlet stream of the electroacidification unit 330 (i.e., stream 318e) may have a silica concentration 1-30% less than the silica concentration of the product outlet stream of ion-exchange unit 328 (i.e., stream 318c).

In particular, FIG. 4 shows an example of electroacidification in the form of an individual bipolar membrane electrodialysis device (i.e., electro-desilicizer) 400 according to some embodiments. In some embodiments, bipolar membrane electrodialysis device 400 can include anion exchange membrane 444, bipolar membrane 446, electrode 442, product inlet stream 456, brine inlet stream 458, product outlet stream 460, brine outlet stream 462, and electrolyte stream 440.

Bipolar membrane electrodialysis device 400 may include a plurality of anion exchange membranes 444. For example, as shown in FIG. 4, two anion exchange membranes 444 are shown alternating with one bipolar membranes 446. However, any number of anion exchange membranes 444 may be used between 1 and 10.

Bipolar membrane electrodialysis device 400 also includes at least one bipolar membrane 446. Bipolar membrane 446 can include anode material 448 and cathode material 450. In some embodiments, anode material 448 of bipolar membrane 446 may be the same material as anion exchange membrane 444. In some embodiments, anode material 448 of bipolar membrane 446 may be different material from anion exchange membrane 444. Any number of bipolar membranes between 1 and 10 may be included in bipolar membrane electrodialysis device 100. In some embodiments, cathode material 450 can be a cation exchange membrane.

Due to the polarization (+ and −) of the electric field created by a positive electrode 442 and a negative electrode 442, dissolved ions migrate towards the membrane material of opposite charge. Thus, anions migrate towards the positive electrode (anode) 442 and cations migrate towards the negative electrode (cathode) 442. When an electron moves to the positive electrode 442 via the external circuit, one ion can be transferred across an ion exchange membrane in order to maintain charge neutrality within the system. For example, in the system shown in FIG. 4, this means that an anion is transferred across an anion exchange membrane 444. However, at bipolar membrane 446, ions are blocked from transferring across the membrane. Instead, water ($H_2O$) is disassociated into $H^+$ and $OH^-$ ions. Thus, in the brine channels or acid chambers 454 (i.e., spaces between cathode material 450 of bipolar membrane 446 and anion exchange membrane 444, where brine inlet stream 458 enters bipolar membrane electrodialysis device 400 and brine outlet stream 462 exits bipolar membrane electrodialysis device 400), electroneutrality is achieved by hydronium ions balancing the anions that are transferred across the anion exchange membrane 444. This in turn can increase the concentration and lowers the pH of the brine streams in the brine channel.

In the process channels or alkaline/base chambers 452 (i.e., spaces between anode material 448 and anion exchange membrane 444, where process inlet stream 456 enters bipolar membrane electrodialysis device 400 and process outlet stream 460 exits bipolar membrane electrodialysis device 400), hydroxide ions are transferred via bipolar membrane 446, and an anion (e.g., $Cl^-$, $SiOH_3^-$) is transferred across anion exchange membrane 444 to satisfy electroneutrality. Adding hydroxide to this stream increases the pH of the process streams in the process channel, increasing the likelihood that silica will ionize. Once silica has been ionized, the influence of the electric field can drive it toward the adjacent anion exchange membrane 444, where it may eventually transfer across anion exchange membrane 444, into the adjacent brine streams/brine channel, and out of bipolar electrodialysis device 400 in brine outlet stream 462.

The inlet streams for bipolar membrane electrodialysis device 400 include product inlet stream 456 and brine inlet stream 458. Product inlet stream 456 may be the desalinated product water obtained from stage one of an electrodialysis system (e.g., traditional electrodialysis). Brine inlet stream 458 may be the waste stream obtained from stage one of an electrodialysis system (e.g., traditional electrodialysis). In some embodiments, product inlet stream 456 may have a lower ionic concentration than brine inlet stream 458.

The outlet streams for bipolar membrane electrodialysis device 400 include product outlet stream 460 and brine outlet stream 462. Product outlet stream 460 may be an outlet stream for a complete electrodialysis system (i.e., having both a first stage for removing dissolved ions and a second stage for removing silica). Thus, product outlet stream 460 may comprise water that has been treated to remove both dissolved ions and silica. Brine outlet stream 462 may be a waste stream. In some embodiments, brine outlet stream may recirculate through a brine recirculation loop of an electrodialysis system.

As described above, a pair of electrodes (including a positive electrode 442 and a negative electrode 442) may be positioned in bipolar membrane electrodialysis device 400 such that they sandwich a stack comprising one or more anion exchange membrane 444 and one or more bipolar membrane 446. In some embodiments, electrolyte stream 440 passes through a region, or channel, between electrode 442 and the adjacent membrane. For example, as shown in FIG. 4, electrolyte stream 442 passes the channel located between each electrode 442 and its adjacent membrane, anion exchange membrane 444.

Referring back to FIG. 3, stream 318c is shown optionally bypassing electroacidification unit 330. In some embodiments, instead of adjusting the pH of the water with electroacidification unit 330, chemicals may be used. For example, caustic 332 may be added to stream 318c to increase the pH of the water. However, as explained above, this may not be desirable, since this process would require on-site chemicals.

In some embodiments, the product of electroacidification 330 (i.e., stream 318e) may be fed to reverse osmosis unit 312. Reverse osmosis unit 312 may include any or all features of reverse osmosis unit 212 of FIG. 2. As shown, reverse osmosis unit produces two streams—product stream 318f (i.e., permeate) and stream 322c (i.e., concentrate). In some embodiments, stream 322c may be routed upstream and used as a brine inlet stream for electroacidification unit 330. In some embodiments, stream 322c may be waste. In some embodiments, particularly in situations where the water recovery may be limited by a low flux rate across the membranes of the reverse osmosis unit 312, hybrid process 300 may include a concentrate recycle loop that runs from concentrate stream 322c upstream to stream 318b.

In some embodiments, the stream 318f (i.e., the outlet stream of reverse osmosis unit 312) may have a silica concentration of 0.01 to 5 ppm. In some embodiments, the silica concentration of stream 318f may be less than 5 ppm, less than 4 ppm, less than 3 ppm, less than 2 ppm, less than 1 ppm, less than 0.5 ppm, less than 0.1 ppm, or less than 0.05 ppm. In some embodiments, the silica concentration of stream 318f may be more than 0.01 ppm, more than 0.05 ppm, more than 0.1 ppm, more than 0.5 ppm, more than 1 ppm, more than 2 ppm, more than 3 ppm, or more than 4 ppm.

In some embodiments, hybrid process 300 may include electrodeionization unit 314. Electrodeionization unit 314 may be used as a polishing step after processed by reverse osmosis unit 312. Electrodeionization unit 314 may include any and/or all features of electrodeionization unit 214 of FIG. 2. As shown, the product stream of reverse osmosis unit 312, stream 318f, is the feed stream for electrodeionization unit 314. In some embodiments, electrodeionization unit 314 produces two streams-product 320 and stream 322d. In some embodiments, stream 222c may be a waste stream. In some embodiments, product stream 220 may comprise ultra-pure water.

In some embodiments, electrodeionization unit 314 is configured to further reduce the level of contaminants (e.g., silica) in the water. For example, the level of silica in product stream 320 may be from 0.001 to 0.030 ppm. In some embodiments, the silica concentration in the product stream may be less than 0.030 ppm, less than 0.025 ppm, less than 0.02 ppm, less than 0.015 ppm, less than 0.01 ppm, or less than 0.005 ppm. In some embodiments, the silica concentration of the product stream may be more than 0.001 ppm, more than 0.005 ppm, more than 0.010 ppm, more than 0.015 ppm, more than 0.020 ppm, or more than 0.025 ppm.

The conductivity of the water may also be reduced, such that the conductivity of product stream 320 is less than that of stream 318a, 318b, and/or 318c. In some embodiments, the conductivity of product stream 320 may be from 0.01 µS/cm to 1 µS/cm. In some embodiments, the conductivity of product stream 220 may be less than 1 µS/cm, less than 0.8 µS/cm, less than 0.6 µS/cm, less than 0.4 µS/cm, less than 0.2 µS/cm, less than 0.1 µS/cm, less than 0.08, less than 0.06, less than 0.04, or less than 0.02 µS/cm. In some embodiments, the conductivity of product stream 320 may be more than 0.01 µS/cm, more than 0.02 µS/cm, more than 0.04 µS/cm, more than 0.06 µS/cm, more than 0.08 µS/cm, more than 0.1 µS/cm, more than 0.2 µS/cm, more than 0.4 µS/cm more than 0.6 µS/cm, or more than 0.8 µS/cm.

In some embodiments, the concentrate stream may be recycled back to an upstream location of hybrid process 300. For example, as shown in the figure, recycle loop 324b is routed from electrodeionization unit 314 comprising concentrate from the electrodeionization unit 314, to input 318a. This recycle loop can help increase the overall water recovery rate of hybrid process 300.

Treating Feed Water Having a High Silica Concentration

As explained above, particular embodiments of hybrid water treatment processes described herein may be used to most effectively and economically treat water having high silica concentrations (>80 ppm). In some embodiments, hybrid processes for treating water having high silica concentrations may include an electrodialysis reversal unit, a reverse osmosis unit, and/or an electrodeionization unit. In some embodiments, hybrid processes for treating water having high silica concentrations may also include an electrocoagulation unit, a solids removal, an ion-exchange unit, and/or an electroacidification unit.

Figure 5:
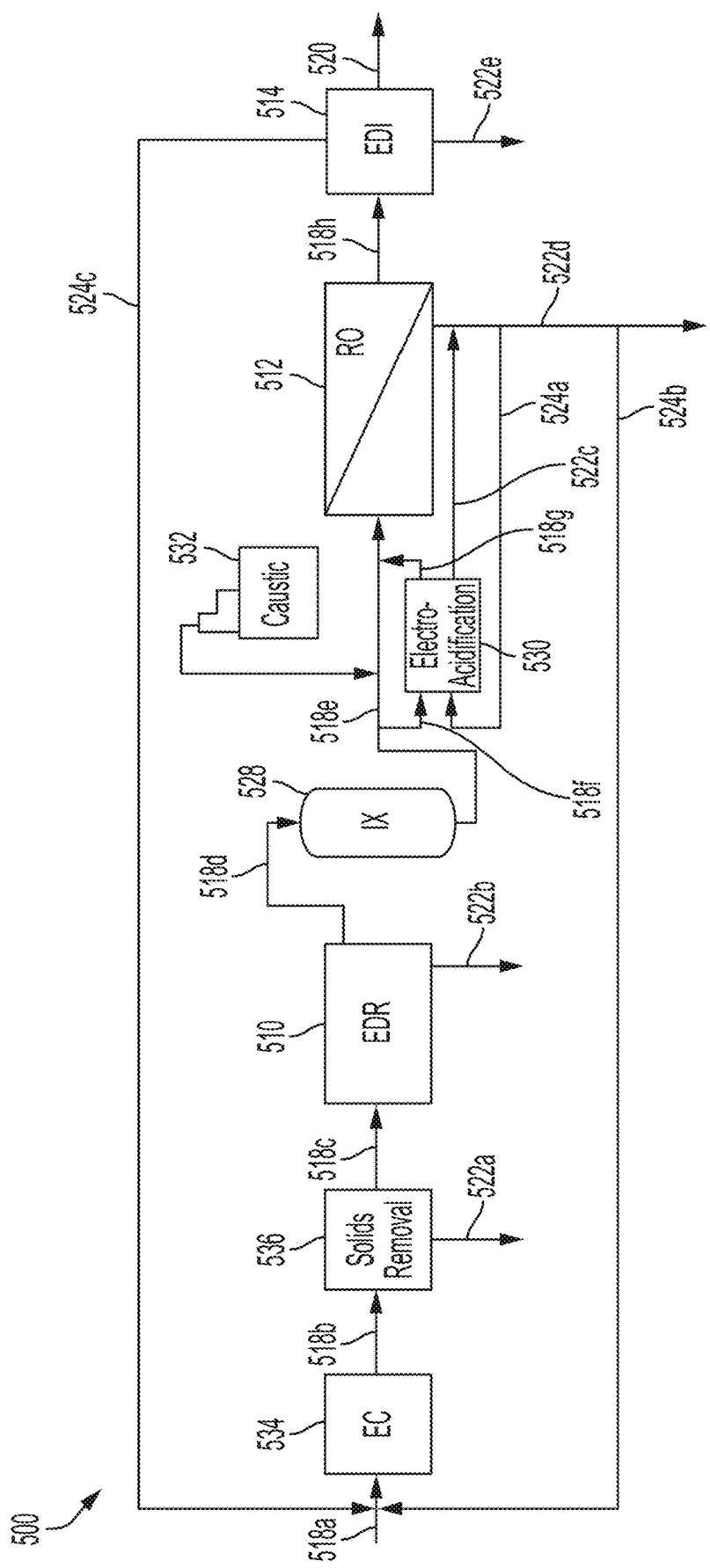
FIG. 5 shows a hybrid process for treating water of high silica concentration, according to some embodiments.

FIG. 5 provides a hybrid process 500 for treating water having high silica concentrations. In some embodiments, hybrid process 500 may include electrocoagulation unit 534, solids removal 536, electrodialysis reversal unit 510, ion-exchange unit 528, electroacidification unit 530, caustic 532, reverse osmosis unit 512, and electrodeionization unit 514. Additionally, hybrid process 500 may include input stream 518a, process streams 518b, 518c, 518d, 518e, 518f, 518g, and 518h, product 520, waste streams 522a, 522b, 522c, and 522d, and recycle loops 524a, 524b, and 524c.

As described above, input 518a may be feed water having a salinity of low to brackish (50 ppm to 5000 ppm). Input 518a may also include any concentration of silica. However, to achieve ultra-pure water as effectively and economically as possible, the feed water of input 518a may include a silica concentration of >80 ppm.

In some embodiments, hybrid process 500 can include an electrocoagulation unit 534. Electrocoagulation unit 534 can remove many different contaminants. As used in the instant process, electrocoagulation unit 534 can remove substantial concentrations of silica. In some embodiments, electrocoagulation unit 534 may include aluminum electrodes at dosage rates of 30 to 150 ppm to remove 90% or more of the silica present in input 518a. In some embodiments, electrocoagulation unit 524 may include a pH adjustment step and/or a coagulant adjustment step to enhance the silica removal.

The outlet of electrocoagulation unit 534 (i.e., stream 518b) may be routed to solids removal 536. Solids removal 536 may include a long residence holding tank, an angled plate separator, a dissolved air floatation system, any other conventional solids removal technologies, or a combination thereof. Solids removal 536 produces two outlet streams—stream 518c and stream 522a. Stream 522a may comprise solids that are waste. In some embodiments, stream 518c (i.e., outlet stream of solids removal unit 522a) may have a silica concentration that is 60-98% less than that of solids removal unit 536 inlet stream 518c.

The product of solids removal 536 (i.e., stream 518c) may be routed to electrodialysis reversal unit 510. Electrodialysis reversal unit 510 may include any and/or all features of electrodialysis unit 310 with respect to FIG. 3, or electrodialysis reversal unit 210 with respect to FIG. 2. As shown, electrodialysis reversal unit produces two outlet streams—stream 318d and stream 522b. Stream 522b may be a brine stream. In some embodiments, stream 522b may be a waste stream.

In some embodiments, hybrid process 500 may include an ion-exchange unit 528. Stream 518d may be routed to ion-exchange unit 528 as an input stream for ion-exchange unit 528. Ion-exchange unit 528 may include any and/or all features of ion-exchange unit 328 of FIG. 3.

In some embodiments, hybrid process 500 may include an electroacidification unit 530. Electroacidification unit 530 may include any and/or all features of electroacidification unit 330 of FIG. 3 and/or the bipolar membrane electrodialysis device depicted in FIG. 4.

In some embodiments, stream 518e may be routed from ion-exchange unit 528 directly to reverse osmosis unit 512. In some embodiments, stream 518e may be routed to electroacidification unit 530 (via stream 518f). By passing the ion-exchange product through electroacidification unit 530, the pH of the water can be adjusted up to 10-10.5. This increase in pH can increase silica solubility in the brine stream of reverse osmosis unit 512. Simultaneously, the reverse osmosis brine flow (i.e., stream 524a) feeds into the channel in which pH is decreased with the addition of a proton, promoting precipitation of silica as the reverse osmosis brine feeds back into electrocoagulation unit 534. Thus, the brine outlet (i.e., stream 522c) of electroacidification unit 530 has a pH that is less than that of brine inlet (i.e., stream 524a) and product outlet (i.e., stream 518g) of electroacidification unit 530 has a pH that is greater than product inlet (i.e., stream 518f). In some embodiments, the silica concentration of the product outlet stream of the electroacidification unit 530 (i.e., stream 518g) may have a silica concentration 1-30% less than the silica concentration of the product outlet stream of ion-exchange unit 528 (i.e., stream 518e).

In some embodiments, stream 518e may bypass electroacidification unit 530. In some embodiments, instead of adjusting the pH of the water with electroacidification unit 530, chemicals may be used. For example, caustic 532 may be added to stream 518e to increase the pH of the water. However, as explained above, this may not be desirable, since this process would require the use of on-site chemicals.

In some embodiments, the product of electroacidification 530 (i.e., stream 518g) may be fed to reverse osmosis unit 512. Reverse osmosis unit 512 may include any or all features of reverse osmosis unit 212 of FIG. 2 and/or reverse osmosis unit 312 of FIG. 3. As shown, reverse osmosis unit produces two streams—product stream 518h (i.e., permeate) and stream 522d (i.e., concentrate). In some embodiments, stream 522d may be routed upstream and used as a brine inlet stream for electroacidification unit 530, as described above. In some embodiments, stream 522d may be waste. In some embodiments, particularly in situations where the water recovery may be limited by a low flux rate across the membranes of the reverse osmosis unit 512, hybrid process 500 may include a concentrate recycle loop that runs from concentrate stream 522d upstream to stream 518a.

In some embodiments, stream 518h (i.e., the outlet stream of reverse osmosis unit 512) may have a silica concentration of 0.01 to 5 ppm. In some embodiments, the silica concentration of stream 518h may be less than 5 ppm, less than 4 ppm, less than 3 ppm, less than 2 ppm, less than 1 ppm, less than 0.5 ppm, less than 0.1 ppm, or less than 0.05 ppm. In some embodiments, the silica concentration of stream 518h may be more than 0.01 ppm, more than 0.05 ppm, more than 0.1 ppm, more than 0.5 ppm, more than 1 ppm, more than 2 ppm, more than 3 ppm, or more than 4 ppm.

In some embodiments, hybrid process 500 may include electrodeionization unit 514. Electrodeionization unit 514 may be used as a polishing step after processed by reverse osmosis unit 512. Electrodeionization unit 514 may include any and/or all features of electrodeionization unit 214 of FIG. 2 and/or electrodeionization unit 314 of FIG. 3. As shown, the product stream of reverse osmosis unit 512, stream 518h, is the feed stream for electrodeionization unit 514. In some embodiments, electrodeionization unit 514 produces two streams—product 520 and stream 522e. In some embodiments, stream 522e may be a waste stream. In some embodiments, product stream 520 may comprise ultra-pure water.

In some embodiments, electrodeionization unit 514 is configured to further reduce the level of contaminants (e.g., silica) in the water. For example, the level of silica in product stream 520 may be from 0.001 to 0.030 ppm. In some embodiments, the silica concentration in the product stream may be less than 0.030 ppm, less than 0.025 ppm, less than 0.02 ppm, less than 0.015 ppm, less than 0.01 ppm, or less than 0.005 ppm. In some embodiments, the silica concentration of the product stream may be more than 0.001 ppm, more than 0.005 ppm, more than 0.010 ppm, more than 0.015 ppm, more than 0.020 ppm, or more than 0.025 ppm.

The conductivity of the water may also be reduced, such that the conductivity of product stream 520 is less than that of stream 518a, 518b, 518c, 518d, 518e, 518f, 518g and/or 518h. In some embodiments, the conductivity of product stream 520 may be from 0.01 µS/cm to 1 µS/cm. In some embodiments, the conductivity of product stream 520 may be less than 1 µS/cm, less than 0.8 µS/cm, less than 0.6 µS/cm, less than 0.4 µS/cm, less than 0.2 µS/cm, less than 0.1 µS/cm, less than 0.08, less than 0.06, less than 0.04, or less than 0.02 µS/cm. In some embodiments, the conductivity of product stream 520 may be more than 0.01 µS/cm, more than 0.02 µS/cm, more than 0.04 µS/cm, more than 0.06 µS/cm, more than 0.08 µS/cm, more than 0.1 µS/cm, more than 0.2 µS/cm, more than 0.4 µS/cm more than 0.6 µS/cm, or more than 0.8 µS/cm.

In some embodiments, the concentrate stream may be recycled back to an upstream location of hybrid process 500. For example, as shown in the figure, recycle loop 524c is routed from electrodeionization unit 514 comprising concentrate from the electrodeionization unit 514, to input 518a. This recycle loop can help increase the overall water recovery rate of hybrid process 500.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method of treating feed water having a silica concentration that produces ultra-pure water comprising:
passing feed water having a silica concentration of 1 to 30 ppm through an electrodialysis reversal unit comprising an inlet stream and a product outlet stream, wherein the inlet stream comprises the feed water,
routing the product outlet stream of the electrodialysis reversal unit to an inlet stream of a reverse osmosis unit, and
routing a product outlet stream of the reverse osmosis unit to an electrodeionization unit resulting in the product outlet stream of the electrodeionization unit producing ultra-pure water.

2. The method of claim 1, wherein the inlet stream of the electrodialysis reversal unit comprises 1 to 10 ppm antiscalant.

3. The method of claim 1, wherein the inlet stream of the reverse osmosis unit is in fluid communication with a concentrate outlet stream of the reverse osmosis unit.

4. The method of claim 1, wherein the inlet stream of the electrodialysis reversal unit is in fluid communication with a concentrate outlet stream of the electrodeionization unit.

5. The method of claim 1, wherein the outlet stream of the reverse osmosis unit has a silica concentration of less than 1 ppm.

6. A method of treating feed water having a silica concentration that produces ultra-pure water comprising:
passing feed water having a silica concentration of 31 to 80 ppm through an electrodialysis reversal unit comprising an inlet stream and a product outlet stream, wherein the inlet stream comprises the feed water;
routing the product outlet stream of the electrodialysis reversal unit to an ion-exchange unit comprising an inlet stream and a product outlet stream;
routing the product outlet stream of the ion-exchange unit to an electroacidification unit comprising a product inlet stream, a product outlet stream, a brine inlet stream, and a brine outlet stream;
routing the product outlet stream of the electroacidification unit to a reverse osmosis unit comprising an inlet stream and a product outlet stream; and
routing the product outlet stream of the reverse osmosis unit to an electrodeionization unit comprising an inlet stream and a product outlet stream, the product outlet stream of the electrodeionization unit producing ultra-pure water.

7. The method of claim 6, wherein the brine inlet stream of the electroacidification unit is in fluid communication with a concentrate outlet stream of the reverse osmosis unit.

8. The method of claim 6, wherein the inlet stream of the electrodialysis reversal unit is in fluid communication with a concentrate outlet stream of the electrodeionization unit.

9. The method of claim 6, wherein the product outlet stream of the electroacidification unit has a silica concentration of 1-30% less than the silica concentration of the product outlet stream of the ion-exchange unit.

10. The method of claim 6, wherein the product outlet stream of the electroacidification unit has a pH of 10-11.

11. The method of claim 6, wherein the outlet stream of the reverse osmosis unit has a silica concentration of less than 1 ppm.

12. A method of treating feed water having a silica concentration that produces ultra-pure water comprising:
passing feed water having a silica concentration of greater than 80 ppm through an electrocoagulation unit comprising an inlet stream and a product outlet stream, wherein the inlet stream comprises the feed water;
routing the product outlet stream of the solids removal unit to an electrodialysis reversal unit comprising an inlet stream and a product outlet stream;
routing the product outlet stream of the electrodialysis reversal unit to an ion-exchange unit comprising an inlet stream and a product outlet stream;
routing the product outlet stream of the ion-exchange unit to an electroacidification unit comprising a product inlet stream, a product outlet stream, a brine inlet stream, and a brine outlet stream;
routing the product outlet stream of the electroacidification unit to a reverse osmosis unit comprising an inlet stream and a product outlet stream; and
routing the product outlet stream of the reverse osmosis unit to an electrodeionization unit comprising an inlet stream and a product outlet stream, the product outlet stream of the electrodeionization unit producing ultra-pure water.

13. The method of claim 12, wherein the brine inlet stream of the electroacidification unit is in fluid communication with a concentrate outlet stream of the reverse osmosis unit.

14. The method of claim 12, wherein the inlet stream of the electrocoagulation unit is in fluid communication with a concentrate outlet stream of the electrodeionization unit.

15. The method of claim 11, wherein the product outlet stream of the solids removal unit has a silica concentration of 60-98% less than the silica concentration of the inlet stream of the solids removal unit.

16. The method of claim 12, wherein the product outlet stream of the electroacidification unit has a silica concentration of 1-30% less than the silica concentration of the product outlet stream of the ion-exchange unit.

17. The method of claim 12, wherein the product outlet stream of the electroacidification unit has a pH of 10-11.

18. The method of claim 12, wherein the product outlet stream of the reverse osmosis unit has a silica concentration of less than 1 ppm.

19. The method of claim 12, wherein the inlet stream of electrocoagulation unit is in fluid communication with a concentrate outlet stream of the reverse osmosis unit.

* * * * *